UNITED STATES PATENT OFFICE.

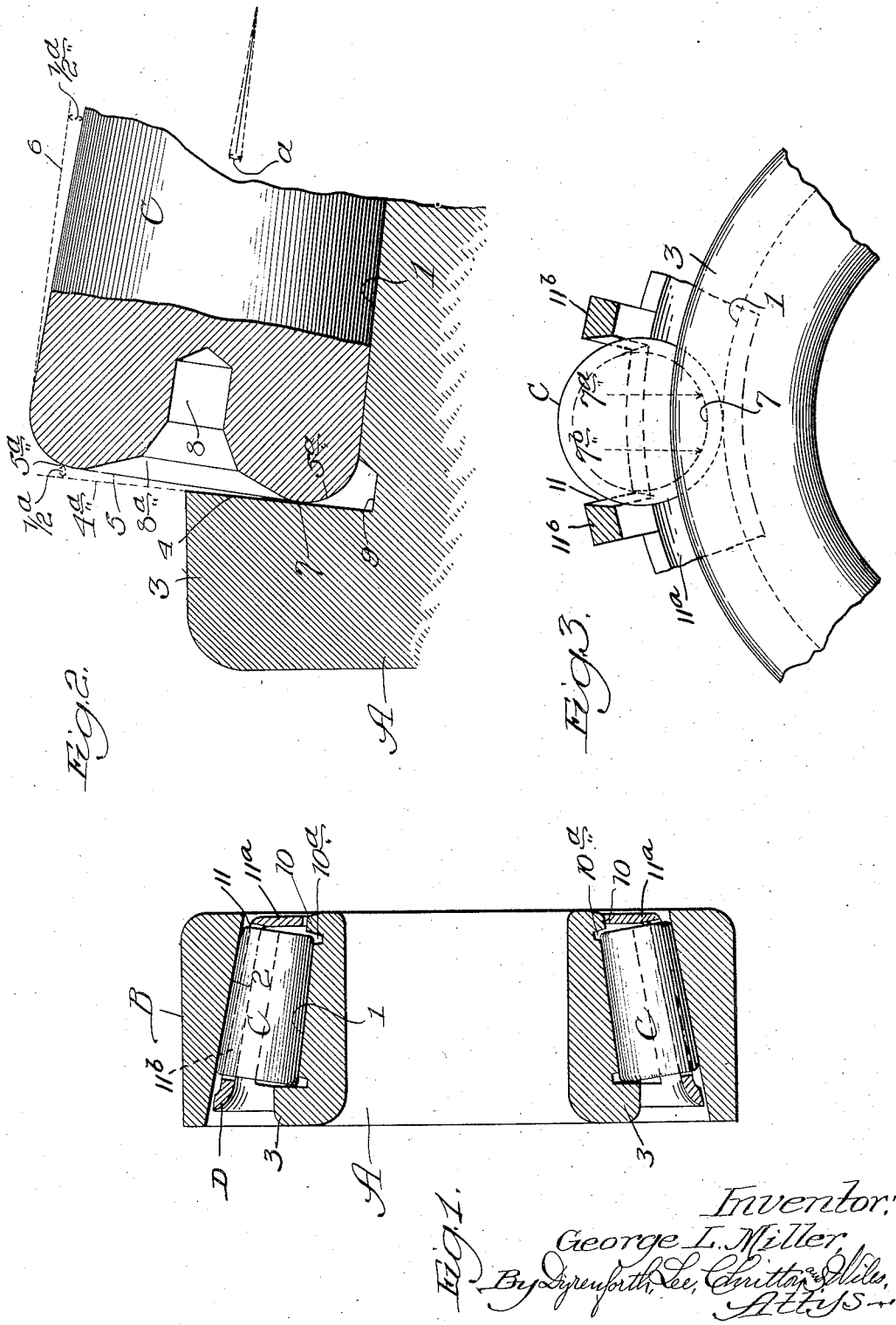

GEORGE L. MILLER, OF CANTON, OHIO, ASSIGNOR TO THE GILLIAM MANUFACTURING COMPANY, OF CANTON, OHIO, A CORPORATION OF OHIO.

ROLLER-BEARING.

1,392,019.   Specification of Letters Patent.   Patented Sept. 27, 1921.

Application filed August 4, 1920. Serial No. 401,216.

*To all whom it may concern:*

Be it known that I, GEORGE L. MILLER, a citizen of the United States, residing at Canton, in the county of Stark and State of Ohio, have invented a new and useful Improvement in Roller-Bearings, of which the following is a specification.

This invention relates particularly to taper roller-bearings; and the primary object of the invention is to provide for a true rolling-contact of the rollers with respect to both the radial thrust and the end thrust of the bearing.

The improved construction provides for maintaining a true line contact between each roller and the conical race surfaces and for maintaining a single-point rolling-contact between each roller and the thrust-flange with which the bearing is provided. Thus, the rollers are prevented from skewing or deviating from their true line contacts with the conical surfaces of the race-members, binding is avoided, and undue pressure upon the roller at any point is obviated. This is accomplished without sliding contact between the ends of the rollers and the thrust-flange. Hence, friction is reduced, and undue heating of the bearing is avoided. For these reasons, the improved bearings operate more efficiently, flaking off of the metal along the conical surfaces of the rollers and race-members is obviated, and sloughing off of the metal at the ends of the rollers is avoided. The result is that the bearing will run comparatively cool, thus increasing the efficiency and prolonging the life of the bearing. Comparative tests made with relation to roller-bearings now on the market and enjoying a wide-spread use indicate that the improved bearing will operate at a temperature of perhaps thirty to forty degrees less, under a heavy load, than the bearings referred to.

The invention is illustrated in its preferred embodiment, in the accompanying drawing, in which—

Figure 1 represents a sectional view of the improved bearing, a fragment of the roller-cage being illustrated; Fig. 2, a broken sectional view of the inner cone, or race-member, and one of the rollers, the view being on an enlarged scale; and Fig. 3, a broken end view showing the parts illustrated in Fig. 2.

It may be stated here that roller-cages are ordinarily employed for keeping the rollers properly spaced with relation to each other; and, in some constructions, the roller-cages are relied upon to prevent the rollers from skewing from their true line position. The present invention contemplates the use of a suitable cage for preserving the spaced relation of the rollers, but the spaces for the rollers should be sufficiently large to permit freedom of movement of the individual rollers, and the cage should not be depended upon to preserve the correct alinement of the rollers with relation to the race-surfaces.

It has been proposed heretofore to maintain the true line contact between the rollers and the conical race-surfaces by providing a two-point sliding-contact between the large ends of the rollers and the thrust-flange of the inner cone. Such a construction is subject, in large measure, to the objections which pertain to the use of the roller-cage itself for maintaining line contact between the rollers and the conical race-surfaces. That is, the sliding action which such a construction entails produces friction, causes undue heating of the bearing, and results in flaking or sloughing off the metal, which mixes with the lubricant, and thus the efficiency and life of the bearing are reduced.

In the construction illustrated in the accompanying drawing, A represents an inner cone, or race-member; B represents an outer cone or race-member; C, C represent the rollers; and D represents the roller-cage. The race-members A and B are provided with truncated conical surfaces 1 and 2, which, if extended, would meet at a common apex. That is, these conical race-surfaces converge toward a common point; and the rollers are taper rollers confined between these surfaces, and the included angle between the taper sides of each roller is the same as the angle between the converging race-surfaces of the bearing.

One of the cones, preferably the inner cone A, is provided at its large end with a thrust-flange 3 whose inner side presents a thrust-surface 4 which is substantially at right angle to the conical bearing-surface 1. The included angle of the roller C is indicated in the small diagram in connection with Fig. 2 and is designated *a*. The planes of the ends of the roller are normal to the axis of the roller. Thus, the plane of the large end of the roller is designated 5 in Fig. 2. The annular corners of the rollers are rounded, however, as indicated at 5ª. It follows that there is an angle equal to one-half the angle $a$ between the taper-surface of the roller and a line 6 parallel to the axis of the roller, as indicated in Fig. 2; also, that there is an angle equal to one-half the angle $a$ between the end plane 5 of the roller and the thrust-surface 4 of the inner cone. The extension of the thrust-surface 4 is indicated by the dotted line 4ª and the angle between the end plane of the roller and the thrust-surface of the flange is designated $\frac{1}{2}a$. In practice, the angle $a$ is quite small, ordinarily about three degrees. The thrust-surface 4 is tangential to the curve 5ª seen in longitudinal section. It follows that there is a single-point contact, as indicated at 7, between the large end of the roller and the thrust-flange. Following the line 5 which marks the plane of the end of the roller, and which also indicates the rolling-contact circle between the end of the roller and the thrust-flange, it will be understood that the end plane of the roller diverges from the thrust-surface above the contact-point 7, thus leaving a slight clearance only just above the contact-point. If, in operation, the roller should skew slightly from its true line contact with the cone, contact would be instantly established between the end of the roller and the thrust-surface at a point one side or the other and slightly above the contact-point 7. In Fig. 3, it is assumed, for illustration, that the newly established contact-point would be either at the point 7ª or the point 7ᵇ, depending upon which way the roller skews from its true line-contact position.

Thus, if the roller skews slightly, the newly established contact-point immediately exerts a corrective influence and returns the roller to its true line-contact position. Normally, the end of the roller has a single-point rolling-contact with the thrust-flange, so that no sliding action occurs in the normal operation of the roller.

It is preferred to provide the large end of the roller with a central recess 8 adapted to receive lubricant. The curved surfaces 5ª are extended inwardly so as to provide the end of the roller with a concavity 8ª which communicates with the central recess 8. It follows that the lubricant introduced into the bearing can freely enter the recess 8 and pass to the contact-point 7. It is preferred, also, to provide an annular recess 9 at the junction between the conical surface 1 and the inner surface of the thrust-flange, so that the lubricant can collect there and work along the conical bearing surface of the inner cone.

While the tendency of the taper rollers, because of their wedge-like shape, is to work toward the thrust-flange 3, it is usual to provide an inner flange or shoulder to maintain the bearing in assembled condition. In Fig. 1, the flange 10 designates such a retaining shoulder formed integrally with the inner cone. In some cases, however, the retaining flange is in the form of a split ring, as illustrated, for example, in my Patent No. 1,282,450, granted October 22, 1918. It is preferred to provide, adjacent the flange 10, an annular recess 10ª, in which lubricant may collect.

It is usual to provide the thrust-flange on the inner cone or race-member, and this is the preferred form. If desired, for any reason, however, this may be reversed and the thrust-flange may be provided on the outer race-member or cup.

Referring to Fig. 2, it will be seen that the thrust-surface 4, in the preferred construction, is perpendicular to the conical race-surface 1. Such construction provides a sufficiently small clearance angle between the end plane of the roller and the thrust-surface of the flange to enable a corrective influence to be applied the instant a roller tends to skew from the true line-contact position. It will be seen, however, that the angle between the thrust-surface 4 and the conical-surface 1 may be reduced to slightly less than a right angle, and still permit some clearance. In fact, the angle may be reduced to a point approaching the elimination of the angle $\frac{1}{2}a$. There should, however, always be a slight clearance angle between the end plane of the roller and the thrust-surface of the flange to insure a single-point rolling-contact between the end of the roller and the thrust-surface of the flange.

The beneficial results enumerated above are obtained by means of the improved construction. It may be stated, also, that where the angle between the conical surface 1 and the thrust-surface 4 is a right angle, the grinding of the surface of the inner race-member is facilitated. Thus, the conical surface 1 may be ground by the circumferential surface of the grinding-wheel; and, assuming the lateral surface of the grinding-wheel to be perpendicular to the axis of the grinding-wheel, the lateral surface of the grinding-wheel may be employed to grind the surface 4 normal to the surface 1. Thus, a single grinding operation will suffice to produce a true inner race-member.

The roller-cage D may be of any suitable construction. As shown, it comprises a conical shell provided with roller-receiving slots 11 and with an inturned flange 11ª at its small end. The slotted construction provides longitudinal members 11ᵇ which separate the rollers. The slots 11 are large enough, however, to allow the self-righting action of the rollers to occur.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is—

1. A roller-bearing comprising inner and outer race-members having convergent taper race-surfaces, a series of interposed self-righting taper rollers provided at their large ends with rounded corners, and a thrust-flange carried by the large end of one of the race-members and having a thrust-surface disposed in a plane approximately parallel with the end plane of the rollers but with a slight clearance angle between said planes, each roller having a single-point contact with the thrust-surface of the flange in normal operation and said thrust-surface serving to engage the roller at points immediately flanking the normal contact point and thus return the rollers to true line-contact position when slight deviations occur, the successive contact points at the large end of the roller forming an annular line affording a plane normal to the axis of the roller.

2. A roller-bearing comprising an inner race-member having a taper race-surface and provided at its large end with a thrust-flange having a thrust surface approximately normal to the race-surface, an outer race-member, and interposed self-righting taper rollers having their large ends provided with rounded corners which terminate in an end surface lying in a plane normal to the roller-axis and adapted to make single-point contact with said thrust-surface, a slight clearance angle only being left between the end plane of the roller and said thrust-surface, whereby the thrust surface will, upon slight deviation of the roller from true line-contact with the race-surfaces, exert immediately a turning moment and restore the roller to true line-contact.

3. A roller-bearing comprising an inner race-member having a taper race-surface and provided at its large end with a thrust-flange having a thrust-surface perpendicular to the race-surface, an outer race-member, and interposed self-righting taper rollers having their large ends provided with rounded corners which make single-point contact with said thrust-surface, thus providing a slight clearance angle only between the end plane of the roller and the thrust-surface, the annular rounded corner of the large end of each roller merging in a plane normal to the axis of the roller, said thrust surface serving on slight deviation of the roller from true line-contact position to exert immediately a turning moment and restore the roller to true line contact position for the purpose set forth.

4. A roller-bearing comprising an inner race-member having a taper race-surface and provided at its large end with a thrust-flange having a thrust-surface approximately normal with relation to the race-surface, an outer race-member having a taper surface converging with respect to the taper surface of the inner race-member, and interposed taper rollers having their large ends provided with rounded corners which make single-point contact with said thrust-surface, a slight clearance angle only being left between the end of the roller and said thrust-surface, the large ends of the rollers having lubricant recesses adapted to conduct lubricant to the single-point contacts at the large ends of the rollers.

5. A roller-bearing comprising inner and outer race-members and a series of interposed self-righting taper rollers, which are out of contact with each other, one of said race-members having an end-thrust surface and each of said rollers having single-point thrust contact with said thrust-surface and presenting a circle of said contact points forming a thrust plane for the roller which is normal to the axis of the roller, the thrust plane of the roller forming a slight clearance angle only with respect to a radial line lying in the thrust surface of the race-member, the thrust surface of said flange serving, on slight deviation of the roller from true line-contact position, to exert immediately a turning moment and restore the roller to true line contact position, for the purpose set forth.

6. A roller-bearing comprising an annular race adapted to receive conical rollers, and self-righting conical rollers out of contact with each other in said race, said race being provided with an end thrust surface, and each of said rollers having a thrust surface in a plane normal to the axis of the roller and having single point contact with and forming a very slight clearance angle with said first-named surface, said surfaces being adapted to exert corrective re-action on the roller upon a slight deviation of the roller from its true line contact position in the race, whereby the roller is rendered self-righting.

7. A roller-bearing comprising an inner race-member having a taper race-surface and provided at its large end with a thrust-flange having a thrust surface approximately normal to the race-surface, an outer race-member, interposed self-righting taper rollers having their large ends provided with rounded corners which terminate in an end surface lying in a plane normal to the roller-axis and adapted to make single-point contact with said thrust-surface, a slight clearance angle only being left between the end plane of the roller and said thrust-surface, whereby the thrust-surface will, upon slight deviation of the roller from true line-contact with the race-surfaces, exert immediately a turning moment and restore the roller to true line-contact, and a cage spacing said rollers, said cage having pockets receiving the rollers freely therein and permitting the self righting action of the rollers to occur.

8. A roller-bearing comprising an annular race adapted to receive conical rollers, self-righting conical rollers out of contact with each other in said race, said race being provided with an end thrust surface, and each of said rollers having a thrust surface in a plane normal to the axis of the roller and having single point contact with and forming a very slight clearance angle with said first-named surface, said surfaces being adapted to exert corrective reaction on the roller upon a slight deviation of the roller from its true line contact position in the race, whereby the roller is rendered self-righting, and a cage spacing said rollers, said cage having pockets receiving the rollers freely therein and permitting the self righting action of the rollers to occur.

GEORGE L. MILLER.